(12) United States Patent
MacDonald

(10) Patent No.: US 12,723,512 B2
(45) Date of Patent: Sep. 1, 2026

(54) MINING SYSTEM WITH A FLEXIBLE CONVEYOR SYSTEM

(71) Applicant: UNDERGROUND EXTRACTION TECHNOLOGIES PTY LTD, Brisbane (AU)

(72) Inventor: Brian MacDonald, Brisbane (AU)

(73) Assignee: Underground Extraction Technologies Pty LTD, Brisbane (AU)

( * ) Notice: Subject to any disclaimer, the term of this patent is extended or adjusted under 35 U.S.C. 154(b) by 387 days.

(21) Appl. No.: 17/433,423

(22) PCT Filed: Feb. 25, 2020

(86) PCT No.: PCT/AU2020/050162

§ 371 (c)(1),
(2) Date: Aug. 24, 2021

(87) PCT Pub. No.: WO2020/172703

PCT Pub. Date: Sep. 3, 2020

(65) Prior Publication Data

US 2022/0145761 A1 May 12, 2022

(30) Foreign Application Priority Data

Feb. 25, 2019 (AU) ................................ 2019900589

(51) Int. Cl.
*E21F 13/08* (2006.01)
*B65G 37/00* (2006.01)
(Continued)

(52) U.S. Cl.
CPC .......... *E21F 13/083* (2013.01); *B65G 37/005* (2013.01); *B65G 41/008* (2013.01);
(Continued)

(58) Field of Classification Search
CPC .......... E21C 27/24; E21C 35/08; E21C 35/20; E21C 35/24; E21F 13/02; E21F 13/06;
(Continued)

(56) References Cited

U.S. PATENT DOCUMENTS 2,674,364 A * 4/1954 Cartlidge ................ E21F 13/02 198/594
2,776,040 A * 1/1957 Snyder ................. B65G 17/066 198/304
(Continued)

FOREIGN PATENT DOCUMENTS

DE 102011105747 A1 12/2012
EP 2125582 12/2009
(Continued)

OTHER PUBLICATIONS

India Patent Office, First Examination Report dated Apr. 24, 2023.
Remote Ops Center eBook—https://share.google/F166DORtxeMU2ZRVT.

*Primary Examiner* — Janine M Kreck
(74) *Attorney, Agent, or Firm* — DeLio Peterson & Curcio LLC; Kelly M. Nowak

(57) ABSTRACT

The present invention relates to a mining system including a continuous miner. The continuous miner mines material and includes a miner navigation system. The mining system further includes a flexible conveyor system for receiving the mined material from the continuous miner. The flexible conveyor system includes a conveyor navigation system. The mining system further includes control means for controlling the miner navigation system and the conveyor navigation system so that the flexible conveyor system receives the mined material from the continuous miner. Preferably, the flexible conveyor system need not be coupled
(Continued)

to the continuous miner, and can be extracted separately in the event of a cave-in on the miner.

10 Claims, 4 Drawing Sheets

(51) Int. Cl.
*B65G 41/00* (2006.01)
*E21F 13/06* (2006.01)
*G05D 1/00* (2024.01)

(52) U.S. Cl.
CPC ........ *E21F 13/06* (2013.01); *B65G 2201/042* (2013.01); *B65G 2207/30* (2013.01); *G05D 1/0011* (2013.01); *G05D 1/0212* (2013.01); *G05D 1/027* (2013.01)

(58) Field of Classification Search
CPC ........ E21F 13/08; E21F 13/083; B65G 15/22; B65G 15/24; B65G 37/005; B65G 41/007; B65G 41/008; B65G 2201/042; B65G 2207/30; G05D 1/0011; G05D 1/0212; G05D 1/027; G05D 2201/0202
See application file for complete search history.

(56) References Cited

U.S. PATENT DOCUMENTS 3,031,214 A 4/1962 Horne et al.
3,268,058 A * 8/1966 Buckeridge ............. E21F 13/02 198/304
4,740,037 A 4/1988 Eager et al.
5,246,274 A * 9/1993 Smith ..................... E21C 27/24 299/30
5,881,832 A 3/1999 Zitz et al.
5,967,616 A * 10/1999 Offutt ..................... E21C 35/20 299/30
5,992,941 A * 11/1999 Delli-Gatti, Jr. ...... E21F 13/083 299/56
9,179,475 B2 11/2015 Koleszar et al.
9,258,722 B2 2/2016 Schmidt et al.
10,113,425 B2 10/2018 MacDonald et al.
2001/0015573 A1* 8/2001 Mraz ....................... E21C 35/24 299/33
2004/0054434 A1* 3/2004 Sturges ................. E21F 13/083 700/213
2011/0297395 A1 12/2011 Codesal et al.
2012/0146387 A1 6/2012 Shatters
2013/0118862 A1 5/2013 Stewart
2016/0096688 A1* 4/2016 Hartcher ................. E21C 35/24 198/304
2018/0029801 A1* 2/2018 Dampfhofer .......... B65G 15/60
2018/0141764 A1* 5/2018 Bartholomew ...... B65G 63/008

FOREIGN PATENT DOCUMENTS

WO 2016044886 A1 3/2016
WO 2018068866 A1 4/2018
WO 2020000054 A1 1/2020

* cited by examiner

MINING SYSTEM WITH A FLEXIBLE CONVEYOR SYSTEM

TECHNICAL FIELD

The present invention relates to a mining system with a flexible conveyor system. The present invention has particular, although not exclusive use to coal mining.

BACKGROUND

The reference to any prior art in this specification is not, and should not be taken as an acknowledgement or any form of suggestion that the prior art forms part of the common general knowledge or forms part of the prior art base at the priority date.

Flexible conveyor systems are used in mining operations. The systems include serially interconnected conveyor modules that convey mining material away from a continuous miner at the cutting face.

Australian Provisional Application AU2018902865 (See also WO2020/028946) describes a flexible conveyor system 100 as shown in FIG. 1. The system 100 includes a transportable supply conveyor module 102 and a like transportable receiver conveyor module 104. A hitch mechanism 106 is provided for pivotally coupling the supply conveyor module 102 to the receiver conveyor module 104 about a vertical pivot axis 108 so that the receiver conveyor module 104 receives conveyed mined material (rock, coal, ore, etc.) from the supply conveyor module 102 proximal to the pivot axis 108.

Turning to FIG. 2, each conveyor module 102, 104 includes a like frame chassis 200. The chassis 200 includes a rectangular base frame 202 from which a pair of inclined hitch arms 204 extend upwardly. The chassis 200 includes a pivot arm 206 extending between the hitch arms 204. The pivot arm 206 pivots about both the vertical axis 108, and a horizontal axis 208 by virtue of end connecting pins 209. The chassis 200 further includes a pivot bearing 210 in the centre of the pivot arm 206 and co-incident with the vertical axis 108.

Each conveyor module 102, 104 further includes steering using a pair of driven wheels 212 with the drive motors being either electric or hydraulic powered. Each wheel 212 rotates about a respective vertical axis 214 and its rotation is driven by a steering actuator. Both of the wheels 212 also rotate about a longitudinal axis 216 by way of bogie 218 upon which the wheel support mechanisms are mounted.

Returning to FIG. 1, an inclined endless belt 110 of the supply conveyor module 102 extends above and overlaps an inclined endless belt 112 of the receiver conveyor module 104. The system 100 further includes a concave hood retainer 114, fixed to the supply conveyor module 102, for retaining any errant mining material dropping from the supply conveyor module 102 to the receiver conveyor module 104.

The system 100 further includes a concave spoon deflector 116, at the base of the retainer 114, for deflecting material dropping from the supply conveyor module 102 onto the endless belt 112 of the receiver conveyor module 104. The deflector 116 is rotationally mounted on a slew ring 118 on the supply conveyor module 102. The system 100 also includes a strike arm 120 fixed on the receiver conveyor module 104 and engaged with a pin extending from the rotating spoon deflector 116.

In practice, the flexible conveyor system 100 includes many of the like conveyor modules 102, 104 coupled together with the hitch mechanisms 106 to form a train. In turn, the train is coupled to the continuous miner. In the event of a tunnel cave-in, the continuous miner can be extracted by pulling on the flexible conveyor train tail as disclosed in Australian Provisional Application AU2018902621 (See also WO2020/014747).

The preferred embodiment provides an improved mining system with flexible conveyor system.

SUMMARY OF THE INVENTION

According to one aspect of the present invention, there is provided a mining system including:

a continuous miner for mining material;

a flexible conveyor system for receiving the mined material from the continuous miner and including a conveyor navigation system; and control means for controlling the flexible conveyor system using the conveyor navigation system so that the flexible conveyor system receives the mined material from the continuous miner.

Preferably, the flexible conveyor system need not be coupled to the continuous miner, and can be extracted separately in the event of a cave-in on the miner. The flexible conveyor system may be lightweight and need not be as durable as other flexible conveyor systems that must sustain a cave-in, as the flexible conveyor system may operate under a supported roof. The continuous miner may include a miner navigation system. The control means may control the flexible conveyor system using both the miner navigation system and the conveyor navigation system.

The front-end conveyor module may carry the conveyor navigation system which actuates wheels of each of the conveyor modules. Each conveyor module may include one or more lateral proximity sensors for sensing the proximity of a tunnel wall, and the control means may use the sensed proximity to avoid collision of the flexible conveyor system with the wall. The control means may control a steering actuator and wheel motor drives to keep a minimum distance of the conveyor modules from the tunnel.

A front end conveyor module may include a front proximity sensor for sensing the proximity of the continuous miner, and the control means may use the sensed proximity to control the flexible conveyor system to follow the continuous miner whilst maintaining a desired distance to receive the mined material.

Each conveyor module may be of a length in the range 3 metres to 10 metres to facilitate turning of the flexible conveyor system. The flexible conveyor system may turn up to 90° without incurring spillage of the mined material passing between modules and without the modules colliding with a tunnel wall.

The control means may include a path planner for planning the path of the continuous miner and flexible conveyor system. The control means may control the continuous miner and flexible conveyor system using feedback from the miner navigation system and the conveyor navigation system. The feedback may include positional feedback of the navigation system.

The control means may include a remote operating centre in communication with the miner navigation system and the conveyor navigation system. The communication may be wireless (e.g. RF). Alternatively, the control means may form part of the miner navigation system or the conveyor navigation system.

Each navigation system may include an inertial navigation system. The continuous miner may be unmanned, or controlled by an operator proximal the continuous miner.

The mining system may further include a static conveyor for receiving mined material from the flexible conveyor system whereby the mined material is conveyed through the static conveyor to the mine's fixed conveyor system. Alternatively the mining system may directly discharge the mined material onto the mine's fixed conveyor system. In each case, the mine's fixed conveyor system then transports the mined material out of the mine.

The mining system may include a supported tunnel roof beneath which the flexible conveyor system is located. The mining system may include a bolter for bolting the roof. The bolter may be borne by the continuous miner or another vehicle.

According to another aspect of the present invention, there is provided a mining system including:

a flexible conveyor system including a conveyor navigation system; and control means for controlling the flexible conveyor system using the conveyor navigation system.

According to another aspect of the present invention, there is provided a mining method for a mining system, the mining system including a continuous miner for mining material, the mining system further including a flexible conveyor system for receiving the mined material from the continuous miner and including a conveyor navigation system, the method involving:

controlling the flexible conveyor system using the conveyor navigation system so that the flexible conveyor system receives the mined material from the continuous miner.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
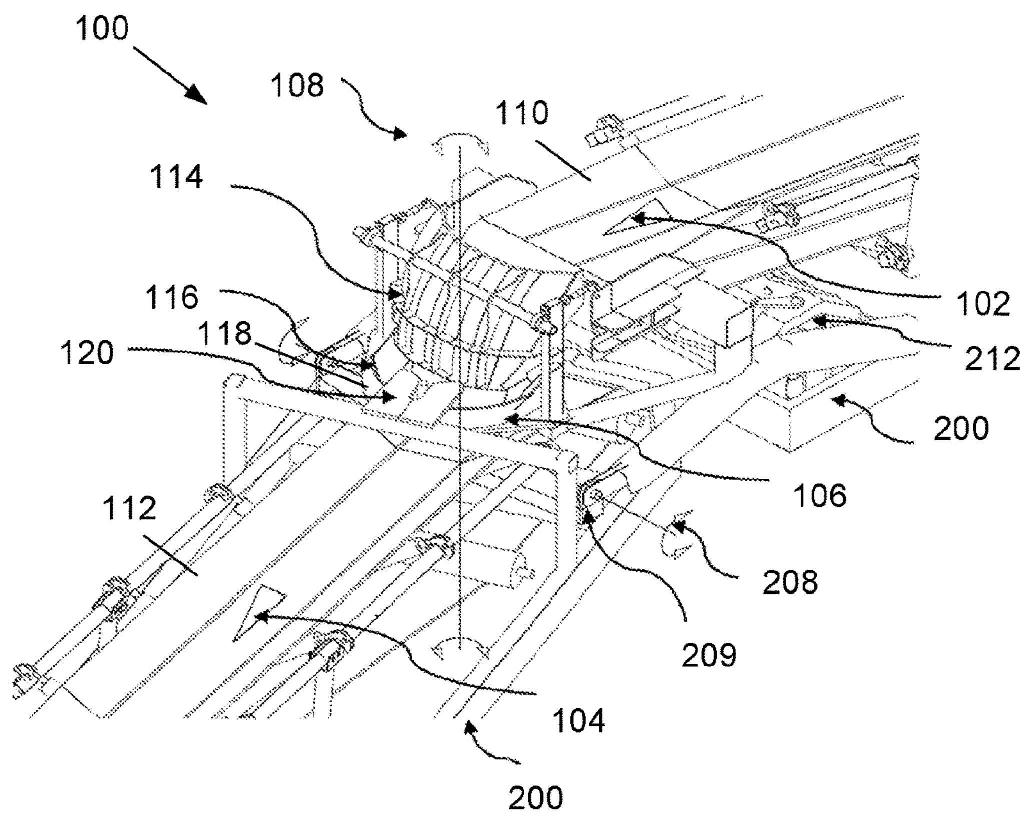
FIG. 1 is a perspective close-up of a flexible conveyor system.
Figure 2:
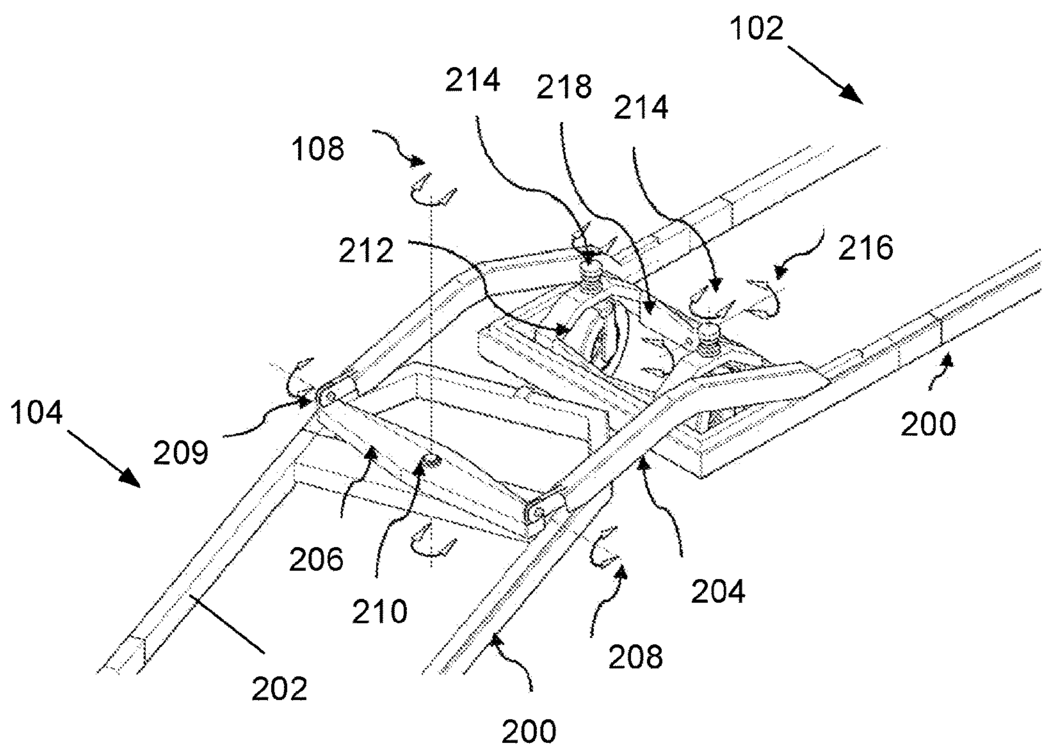
FIG. 2 is a perspective close-up of a chassis of the flexible conveyor system of FIG. 1.
Figure 3:
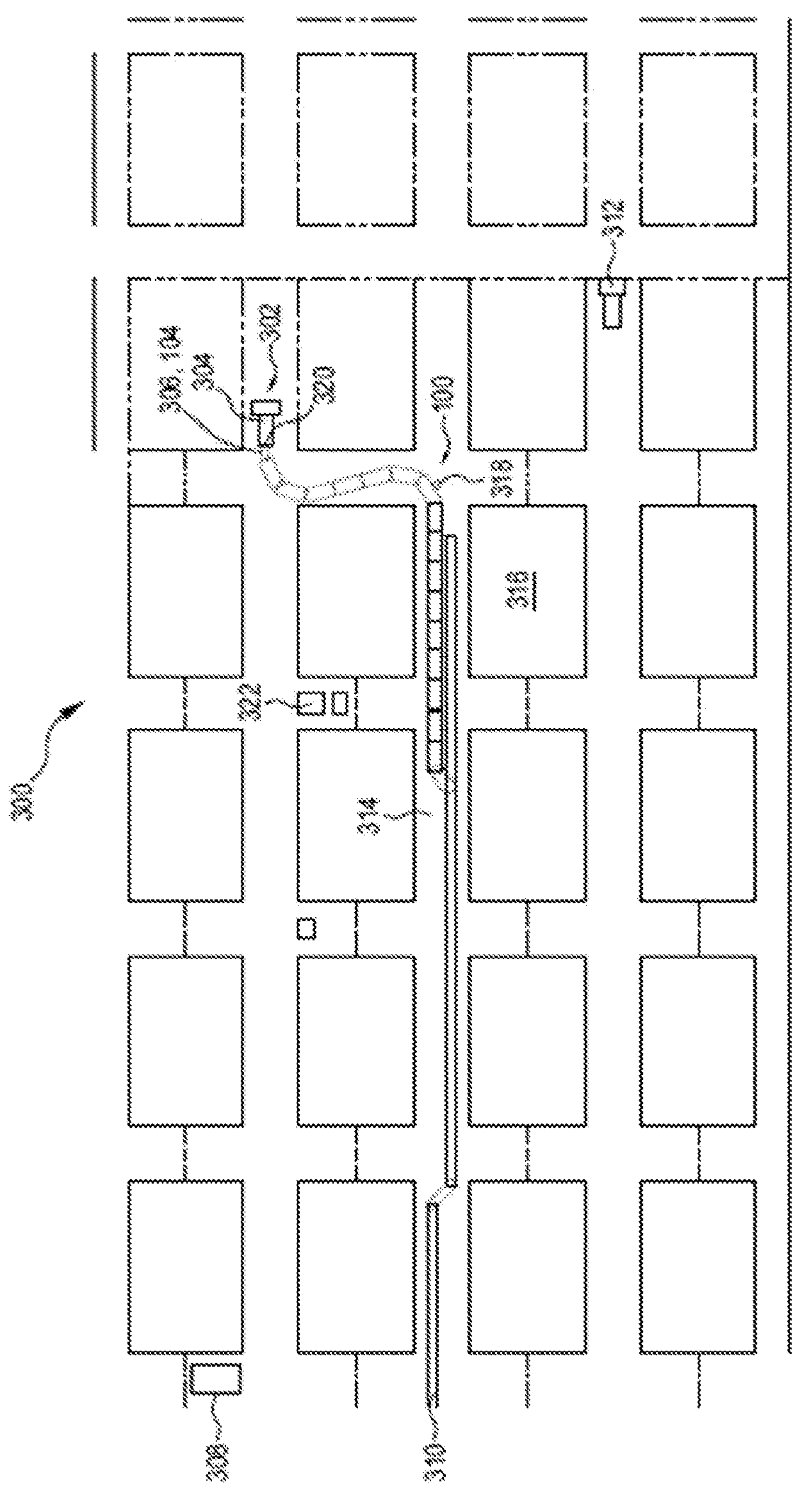
FIG. 3 is a schematic plan view of a coal mining system in accordance with an embodiment of the present invention, including the flexible conveyor system of FIG. 1.

According to an embodiment of the present invention, there is provided an underground coal mining system 300 as shown in FIG. 3. The system 300 includes an unmanned continuous miner 302 for mining material, and including an onboard miner inertial navigation system (INS) 304. The system 100 further includes the flexible conveyor system 100 similar to that described in AU2018902865, incorporated herein by reference. The flexible conveyor system 100 receives the mined material from the continuous miner 302, and includes a conveyor inertial navigation system (INS) 306.

The system 300 further includes a remote operating centre (ROC) 308 having controls. The ROC 308 may either be in wireless RF or direct cable communication with the miner INS 304 and the conveyor INS for remotely operating the miner INS 304 and the conveyor INS. In practice, the ROC 308 may remotely control the miner INS 304 and the conveyor INS so that the flexible conveyor system 100 receives the mined material from the continuous miner 302. The ROC 308 may control the location of the continuous miner 302 and flexible conveyor system 100 using precise positional feedback from the miner INS 304 and the conveyor INS. The continuous miner 302 may also be manually or radio RF controlled by a miner worker in close proximity to the continuous miner 302, with the miner INS 304 communicating with the ROC 308, and the ROC 308 communicating with the conveyor INS 308 so that the flexible conveyor system 100 receives the mined material from the continuous miner 302.

The independent flexible conveyor system 100 is not coupled to the continuous miner 302, and can be extracted separately in the event of a cave-in on the miner 302. Accordingly, the flexible conveyor system 100 is lightweight and need not be as durable as the flexible conveyor system of AU2018902621 that must sustain a cave-in, as the conveyor system 100 instead operates under a reinforced supported roof. The non-coupling of these units also allows for the continuous miner 302 to be independently moved in and out of the cutting area as it undertakes its procedures to mine and remove the mined material, and also to undertake detailed maneuvers in order to turn corners in the area to be mined, with all such minor movements being independent of the flexible conveyor system 100.

The mining system 300 further includes a mobile bolter 312 for bolting the mine roof to re-inforce and support it. The flexible conveyor system 100 is located beneath the resulting supported tunnel roof. The mining system 100 further includes at least one static conveyor 310 for receiving mined material from the flexible conveyor system 100, whereby the mined material is conveyed through the static conveyor 310 to the mine's fixed conveyor system. Alternatively the mining system 100 may directly discharge the mined material onto the mine's fixed conveyor system. In each case, the mine's fixed conveyor system then transports the mined material out of the mine.

The mining system 300 includes a grid of tunnels 314 (or roadways) formed when the continuous miner 302 excavates material. The unmined material blocks 316 remain between the tunnels 314 for support.

The front-end conveyor module 104 carries the conveyor INS which actuates the wheels 212 of each of the serially connected conveyor modules 104. Each conveyor module 104 includes lateral proximity sensors 318 for sensing the proximity of a tunnel wall, and the ROC 308 uses the sensed proximity to avoid collision of the flexible conveyor system 100 with the wall. In particular, the ROC 308 controls a steering actuator of the flexible conveyor system 100 to keep a minimum distance of the conveyor modules 104 from the wall of the tunnel 314.

The front-end conveyor module 104 also includes a front proximity sensor 320 for sensing the proximity of the leading continuous miner 302. The ROC 308 uses the sensed proximity to control the trailing flexible conveyor system 100 to follow the continuous miner 302 whilst maintaining a desired distance to receive the mined material. The desired distance is maintained whether the continuous miner 302 moves backwards or forwards so as to avoid spillage of mined material passing from the continuous miner 302 to the first conveyor module 104.

Each conveyor module 104 is of a length in the range 3 metres to 10 metres to facilitate turning of the flexible conveyor system 100 up to 90° without incurring spillage of the mined material passing between conveyor modules 104 and without the conveyor modules 104 colliding with a wall of the tunnel 314. The ROC 308 guides the flexible conveyor system 100 around corners of the current mining area, by itself as an automated process, sending the flexible conveyor system 100 control signals to guide its movement after obtaining inputs from the continuous miner's INS 304 and the various proximity sensors 318, 320. Advantageously, mine workers or operators are not required to physically control or to guide the flexible conveyor system 100.

Cut and Flit (Bord and Pillar) Mining

A "Cut and Flit" (also known as Bord and Pillar) mining method can be performed using the system 300. The continuous miner 302 is constantly relocated from one tunnel 314 to another, and it typically cuts out up to 10 m-15 m of tunnel 314 at a time, without any supporting roof bolts being installed at the time of cutting out the coal to form the tunnel 314.

The separate bolting machine 312 enters the mined out tunnel 314 after the continuous miner 302 leaves that active mining area, and supporting geotechnical roof bolts are installed in the roof of the tunnel 314. Side supporting "rib" bolts can also be installed if required. Once the supporting bolts have all been installed, then the Bolting machine 312 relocates to another mined out heading that the continuous miner 302 has mined out and installs supporting bolts in that heading.

Subsequently the continuous miner 302 will re-enter the fully installed and supported tunnel 314 and it will mine out another cut of coal (typically 10 m-15 m) in advance of the end of the tunnel 314 that has been developed to date. The trailing flexible conveyor system 100 is then located beneath the supported roof, whereas the leading continuous miner 302 is not.

Bolt in Place Mining

Figure 4:
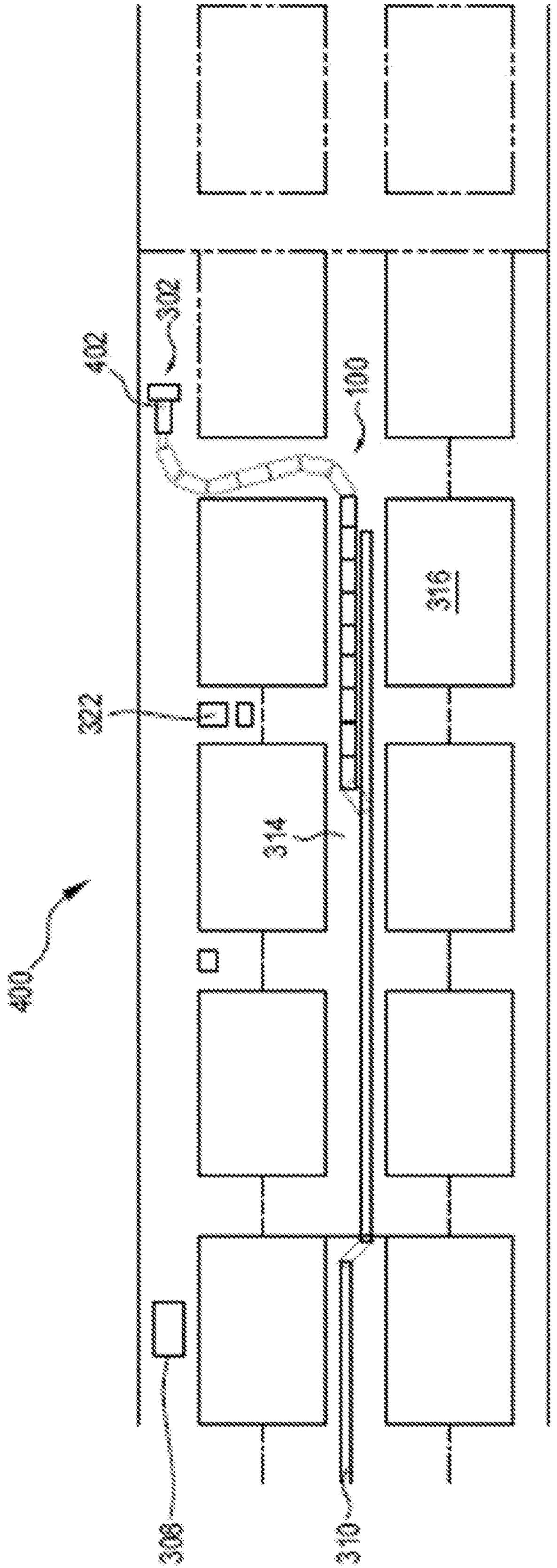
FIG. 4 is a schematic plan view of a coal mining system in accordance with another embodiment of the present invention, including the flexible conveyor system of FIG. 1.

FIG. 4 shows an alternative mining system 400, where like reference numerals refer to like features previously described. Notably, the continuous miner 302 includes an onboard bolter 402 for bolting and reinforcing the tunnel roof whilst excavating a heading.

The Bolting Rigs 402 fitted to the continuous miner 302 are capable of drilling and installing both roof bolts and sidewall "rib" bolts (as required). The continuous miner 302 cuts and mines coal out a sufficient distance in advance of the current end of development (typically only 0.5 m-3 m), and the continuous miner 302 remains in place in the tunnel 314 that is being formed, and supporting roof and rib bolts are installed from the continuous miner 302 itself. The continuous miner 302 is advanced in the direction of mining, cutting out coal as it advances once the supporting roof and ribs bolts have been installed.

In both the "Cut and Flit/Bord and Pillar" system 300 and the "Bolt in Place" system 400, mine workers/operators cannot perform functions required of them within the mining operations unless they are working within a fully supported geotechnical environment (i.e. roof and ribs supported as required). In both systems 300, 400, supporting roof and rib bolts are installed before the continuous miner 302 advances the whole mining panel. Mine services 322, such as ventilation and power supply systems, are installed as the mining panel advances (but only after it is fully supported), and the mine's fixed coal conveyor system 310 is also extended periodically after the mining panels advance a predetermined distance to ensure efficient movement of the fixed coal conveying system equipment 310.

The guidance and automated operating systems 300, 400 described above have many advantages as follows:

- Removes the intermittent and discontinuous transport of coal from the continuous miner 302 to the mine's fixed coal conveying system 310 whilst underground mining trucks (typically called "Shuttle Cars") transport the coal from between the constantly moving continuous miner 302 and the mine's fixed coal conveying system 310. The use of the automatically guided flexible conveyor system 100 ensures constant flow of coal from the continuous miner 302 to the mines fixed coal conveying system 310, thus improving the productivity and the speed at which the overall mining panel advances;
- Reduction in number of mine workers/operators in the mining systems 300, 400 as no one is required to operate the underground mining trucks, or control the unmanned flexible conveyor system 100. This lowers the development system costs and improves mine safety as fewer people are exposed to the hazardous mining environment;
- Reduces the time the continuous miner 302 is under unsupported roof because it takes less time to mine an equivalent amount of coal from the mining area and evacuate that coal from the mining area and transport it out of the mine, due to the continuous nature of coal flow;
- Reduces the cost for roadway tunnel maintenance because there is no traffic by way of underground mine trucks (i.e. Shuttle cars) driving back and forth over the developed roadways 314 requiring constant grading and drainage management;
- Reduces the hazards arising from handling and the repairing of damage to electrical cables due to personnel not having to constantly handle/relocate cables for underground mining trucks as they travel differing routes throughout the mining area as the panel advances (because they don't exist), and a reduced amount of flash-over or damaged cable risk arising from cable interaction with trucks and other associated equipment;
- Removes tyre maintenance costs and hazards to personnel and removes underground truck maintenance costs from the mining operations;
- Removes people interaction with mobile equipment and their associated hazards;
- Allows ventilation of the cutting face via an auxiliary fan & associated duct work which could be mounted to the flexible conveyor system 100 thence reducing the manual labour required to set up ventilation in the mining panel; and
- Allows production improvements by giving the optionality to utilize a wide head continuous miner 302 in a cut & flit situation, to complete the 10 m-15 m cut outs and reduce the relocation time needed from side to side of the roadway 314 when utilising a narrow head machine.

Figure 5:
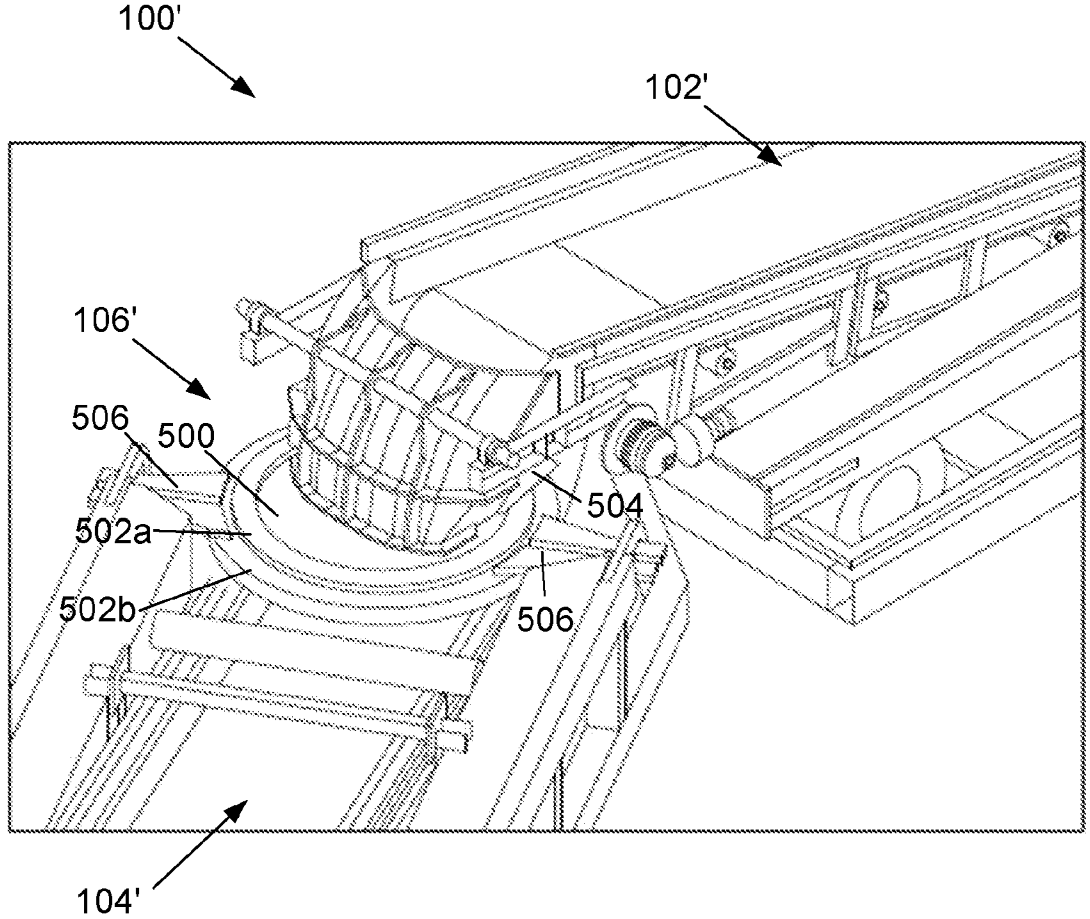
FIG. 5 a perspective close-up of an alternative flexible conveyor system.

FIG. 5 shows a flexible conveyor system 100' in accordance with another embodiment, where like reference numerals refer to like features previously described. The system 100' includes a planar hitch mechanism 106' for pivotally coupling the supply conveyor module 102' to the receiver conveyor module 104' about a vertical pivot axis.

The planar nature of the slew-ring hitch mechanism 106' provides a more lightweight construction than the previous hitch mechanism 106, and enables the tow forces to pass through the centre of the modules 102', 104'. Further, the planar hitch mechanism 106' reduces the height of the flexible conveyor system 100' enabling mining of a thinner seam.

The hitch mechanism 106' defines a central aperture 500 through which the conveyed material passes down from the supply conveyor module 102' to the receiver conveyor module 104'. The aperture 500 is circular with the pivot axis at its centre.

The hitch mechanism 106' includes a pair of inner and outer concentric rings 502*a*, 502*b* able to rotatably slide relative to each other. The rings 502 are typically formed from plastic or metal and have a low friction therebetween. The inner ring 502*a* has a pair of upper and lower fastening tabs 504 for fastening to the supply conveyor module 102'. The outer ring 502*b* passes between the tabs 504, and has a pair of opposed fastening tabs 506 for fastening to the receiver conveyor module 104'.

A person skilled in the art will appreciate that many embodiments and variations can be made without departing from the ambit of the present invention.

In one embodiment, the continuous miner 302 does not include the miner INS 304. Instead, the continuous miner 302 can be manually controlled by an operator driving the continuous miner 302 or proximal the continuous miner 302. Similarly, the operator may manually control the first module of the flexible conveyor system 100 with the remaining conveyor modules being guided by the conveyor (INS) 306.

In the preferred embodiment, the ROC 308 includes a path planner for planning the path of the continuous miner 302 and flexible conveyor system 100, before automatically controlling them to follow the path in synchronicity. In an alternative embodiment, the ROC 308 may incorporate the use of an operator to manually control the movement of the continuous miner 302 and flexible conveyor system 100.

In one embodiment, the ROC 308 may not be present, with its controls instead being incorporated into and form part of the miner INS 304 or the conveyor INS 306.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The claims defining the invention are as follows:

1. A mining system including:

a continuous miner for mining material; and a flexible conveyor system for receiving the mined material from the continuous miner and including a conveyor navigation system, the flexible conveyor system including a chain of like conveyor modules directly serially interconnected together, each like conveyor module elevating the mined material for dropping to an adjacent conveyor module in the chain, each conveyor module including one or more lateral proximity sensors for sensing the proximity of a tunnel wall, and wherein the flexible conveyor system can be coupled to the continuous miner or not coupled to the continuous miner, and when not coupled, can be extracted separately in the event of a cave-in on the miner;

wherein a front-end conveyor module of the flexible conveyor system includes a front proximity sensor for sensing the proximity of the continuous miner, said sensed proximity of the continuous miner is used to control the flexible conveyor system to follow the continuous miner whilst maintaining a desired distance to receive the mined material.

2. A mining system as claimed in claim 1, wherein the flexible conveyor system can operate under a supported roof.

3. A mining system as claimed in claim 1, wherein each conveyor module of the flexible conveyor system is of a length in the range 3 metres to 10 metres to facilitate turning of the flexible conveyor system.

4. A mining system as claimed in claim 1, wherein the flexible conveyor system can turn up to 90° without incurring spillage of the mined material passing between conveyor modules and without the modules colliding with the tunnel wall.

5. A mining system as claimed in claim 1, wherein the navigation system includes an inertial navigation system.

6. A mining system as claimed in claim 1, wherein the continuous miner is unmanned, or controlled by an operator proximal the continuous miner.

7. A mining system as claimed in claim 1, wherein the mining system further includes a static conveyor for receiving mined material from the flexible conveyor system whereby the mined material is conveyed through the static conveyor to a mine's fixed conveyor system which then transports the mined material out of the mine.

8. A mining system as claimed in claim 1, wherein the mining system includes a supported tunnel roof beneath which the flexible conveyor system is located.

9. A mining system as claimed in claim 8, further including a bolter for bolting the roof, the bolter being borne by the continuous miner or another vehicle.

10. A mining system as claimed in claim 1, wherein the flexible conveyor system includes a hitch mechanism for pivotally coupling a supply conveyor module to a receiver conveyor module, the hitch mechanism including concentric rings.

* * * * *